Aug. 4, 1959    H. A. WAGNER    2,897,991
LIFT CARRIAGE CONTROL MEANS
Filed Oct. 28, 1957    2 Sheets-Sheet 1
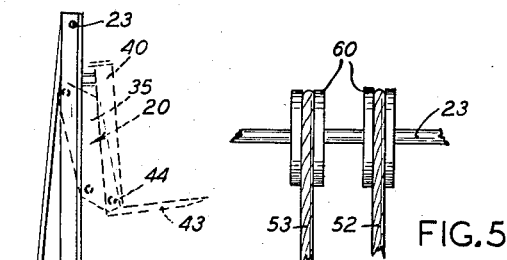
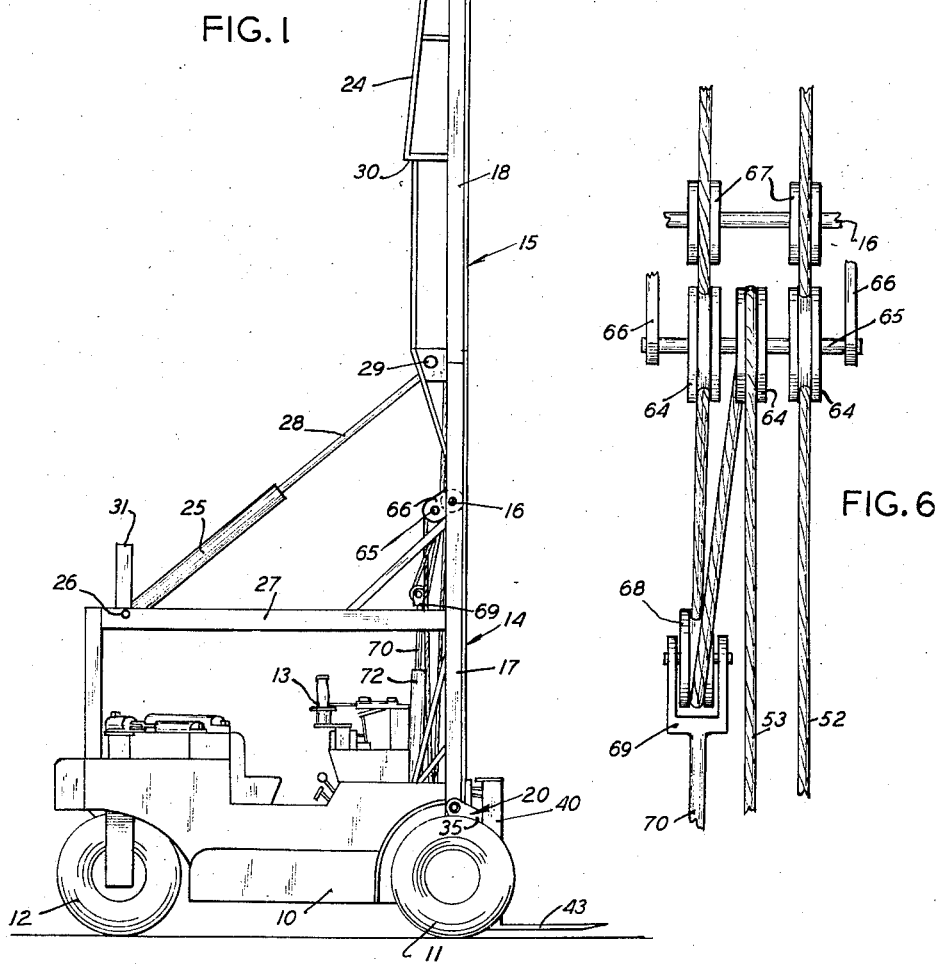
INVENTOR.
HAROLD A. WAGNER
BY
BUCKHORN CHEATHAM & BLORE
ATTORNEYS Aug. 4, 1959 H. A. WAGNER 2,897,991
LIFT CARRIAGE CONTROL MEANS
Filed Oct. 28, 1957 2 Sheets-Sheet 2

INVENTOR.
HAROLD A. WAGNER
BY
BUCKHORN, CHEATHAM & BLORE
ATTORNEYS

United States Patent Office 2,897,991
Patented Aug. 4, 1959

2,897,991
LIFT CARRIAGE CONTROL MEANS

Harold A. Wagner, Portland, Oreg.

Application October 28, 1957, Serial No. 692,829

2 Claims. (Cl. 214—701)

My present invention comprises an improvement in lift vehicles, the improvement relating to the control and operation of a movable carriage and a material handling device mounted thereon. In such machines it is desirable to have a material handling device such as lift fork, bucket, scoop, hay fork, platform, or the like, pivotally mounted upon a vertically movable carriage and including a load supporting portion which extends forwardly in a generally horizontal relation to support materials thereon, and which may be tipped forwardly to cause the materials to be dumped from the device at the desired height. In all such prior devices known to me it has been necessary to stop the carriage at the desired height in order to tip the material handling device to a dumping position or to return it to an upright position. This has meant that considerable time is lost in the operation of a machine of this character, since the operator has, for example, first to load the material on the material handling device, then run the carriage up to the desired relation and secure it at that height, then operate the material handling device control to cause it to tip forward, then reverse the material handling device control to return the device to its upright position, then run the carriage back down to a lower level to receive another load.

The principal object of the present invention is to provide means whereby the angular relationship of the material handling device with respect to the carriage may be altered at any time while the carriage is moving up or down or is stationary at any desired position, thus achieving great rapidity in handling of materials.

A further object of the present invention is to provide a device of the foregoing character in which the vehicle comprises an articulated tower, the tower comprising a lower section which is fixed with respect to the chassis, and a pivoted upper section which may be elevated into prolongation of the lower section or lowered to lie back over the chassis, and in which the carriage and material handling device may be controlled as related above while the carriage is limited to movement along the lower portion of the tower.

The foregoing and other objects and advantages of the present invention will be more readily ascertainable from inspection of the following specification taken in connection with the accompanying drawings wherein a preferred embodiment of the invention is described and illustrated.

In the drawings,

Fig. 1 is a view in side elevation of a typical vehicle embodying the present invention, the vehicle comprising an articulated tower with the upper portion of the tower in elevated position, and with the carriage and material handling device in material supporting relation illustrated in full lines at the ground level and in dash lines at the top of the tower;

Fig. 5 is a partial view taken from the plane indicated at 5—5 in Fig. 3; and

Fig. 6 is a partial view taken from the plane indicated at 6—6 in Fig. 3.

The invention is herein illustrated as comprising a chassis 10 having a pair of forward drive wheels 11 through which automotive power is transmitted from an engine (not shown) contained in the chassis, and a rear tiller wheel 12 for steering the vehicle. Steering is accomplished by means of a steering bar indicated at 13 which controls power steering means forming no part of the present invention, the details of which may be ascertained from my co-pending, concurrently executed application, Serial No. 692,786, filed October 28, 1957. It is to be appreciated that any suitable vehicle may have the present invention associated therewith.

Figure 2:
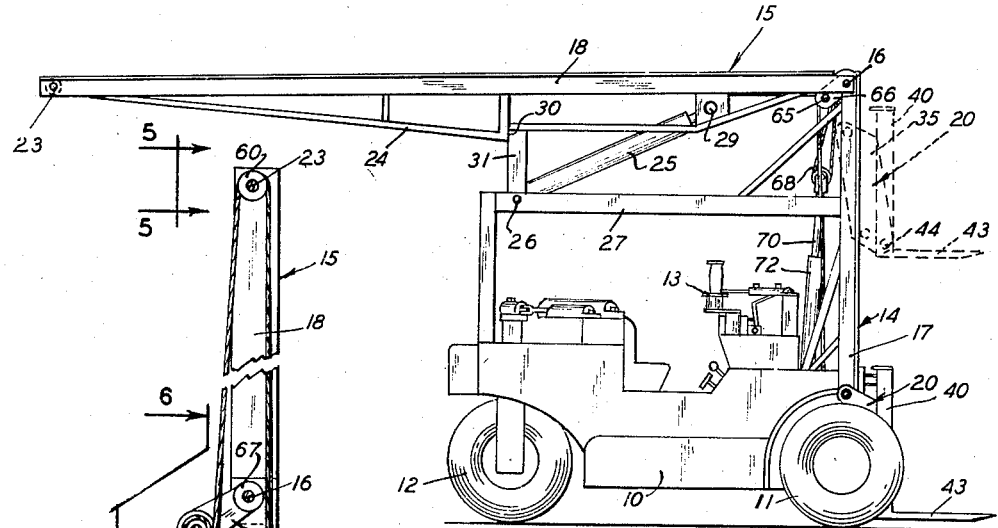
Fig. 2 is a similar view showing the upper portion of the tower in lowered position, and the carriage indicated in full lines at ground level and in dash lines at the top of the lower portion of the tower.

A tower is mounted at the front of the vehicle, the tower comprising a fixed, lower section 14 and a pivotally connected upper section 15 joined together along a transverse pivot 16. The tower comprises a laterally spaced pair of flanged track members 17 on the lower portion and 18 on the upper portion serving to guide a carriage 20 for vertical movement up or down along the tower. For this purpose the carriage is provided with lower flanged wheels 21 which engage the forward surfaces of the flanged track members and upper flanged wheels 22 which engage the rear surfaces of the flanged track members. Suitable cross braces such as the pivot shaft 16 and a top shaft 23 are provided, and the upper portion may be trussed by suitable means as indicated at 24. The upper section is raised or lowered by means of a cylinder 25 pivotally connected at 26 to the rear end of a roof frame 27 on the chassis, and a piston rod 28 projecting forwardly therefrom and pivotally connected to the upper section at 29. When the tower is lowered, as seen in Fig. 2, an abutment 30 thereon engages the rear surface of a rest bracket 31 on the roof frame, the truss 24 thereby supporting the upper portion in lowered position extending rearwardly over the chassis and the abutment 30 engaging the bracket 31 to resist forward stresses applied thereto by the cables to be described.

The carriage 20 comprises a pair of laterally spaced, forwardly projecting side plates 35 connected together by cross plates, such as indicated at 36 and 37, and by an abutment bar 38. A material handling device mounted thereon comprises an upright portion including a laterally spaced pair of upright side members 40 and connecting cross members 41 and 42, and a pair of forwardly projecting material supporting forks 43. The material handling device is pivoted at a lower portion thereof to a lower portion of the carriage by means of a transverse pivot 44. It is to be appreciated that the carriage and material handling device are illustrative, and other forms of carriages could be utilized as well as other forms of material handling devices.

A winch drum comprising a cylinder 46 having end flanges 47 and 48 thereon is fixed to a transverse shaft 49 mounted in the chassis 10 adjacent the base of the tower, the winch drum underlying a slot 50 in the chassis deck 51 through which a pair of cables 52 and 53 extend upwardly. The cable 52 is fastened to the flange 47 of the winch drum and the cable 53 is fastened to the flange 48 thereof, both cables being partially wound around the winch drum in the same direction so as to be payed out or taken in to the same extent simultaneously. The cables being so arranged will wind up toward each other until they touch, then will wind up back toward the flanges and so on. The drum is driven by a gear 55 on shaft 49 meshing with a suitably driven gear 54 under control of the operator.

The cables are properly trained over a plurality of sheaves which will be described first, followed by a description of the manner of training the cables thereover. There are a pair of tower sheaves 60 coaxially mounted for independent rotation on the top shaft 23. A lower carriage sheave 61 is mounted centrally of the carriage 20. Directly above sheave 61 there is an upper carriage sheave 62. Directly forward of sheave 62 there is a material handling device sheave 63 suitably mounted at the top of the upright back portion 40 of the material handling device. There are three intermediate sheaves 64 coaxially mounted for independent rotation on a shaft 65 extending transversely between a pair of brackets 66 extending diagonally rearward and downward from the top of the lower tower section 14. A pair of tower joint sheaves 67 are mounted coaxially for independent rotation on the tower joint pivot 16. A floating sheave 68 is mounted in a clevis 69 at the end of a piston rod 70 which extends upwardly from a cylinder 72 pivotally mounted at 73 on top of the deck 51 adjacent the base of the tower and rearwardly of the slot 50.

The carriage control cable 52 extends upwardly, in front of and in line with one of the intermediate sheaves 64, then up and over one of the tower sheaves 60, then downwardly in front of and in line with one of the tower joint sheaves 67, and then downwardly to the carriage 20 and has its end affixed thereto at 75.

The material handling device cable 53 extends upwardly and over the second intermediate sheave 64, then downwardly and under the floating sheave 68, then upwardly past and in front of the third intermediate sheave 64, then up and over the second tower sheave 60, then downwardly in front of and past the second tower joint sheave 67, then downwardly and under the lower carriage sheave 61, then upwardly and over the upper carriage sheave 62, then forwardly and around the material handling device sheave 63 and back to the top of the carriage where it is affixed thereto at 76.

Figure 3:
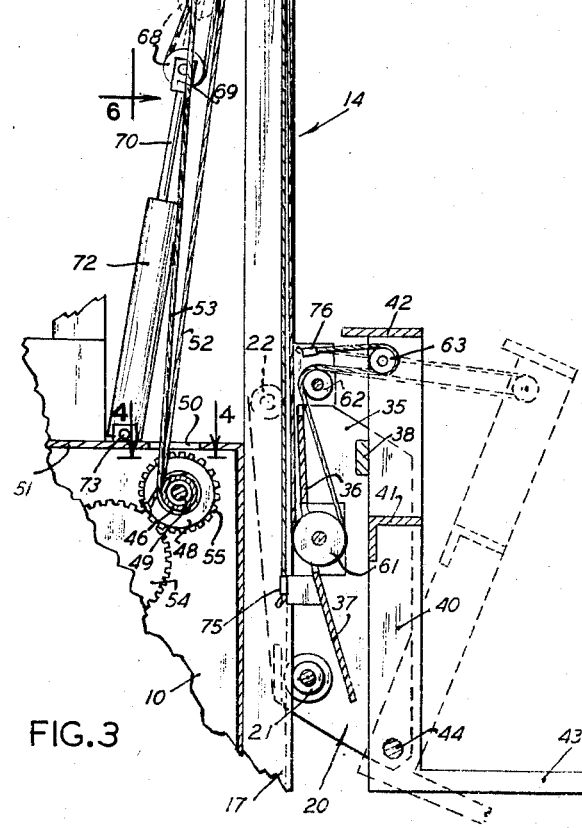
Fig. 3 is a partial, vertical section through the tower and a portion of the chassis, as well as the carriage and material handling device, with a portion of the tower broken away, and the material handling device illustrated in full lines at its material supporting position and in dash lines at a material ejecting position.
Figure 4:
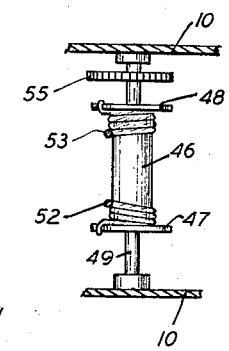
Fig. 4 is a partial, horizontal section taken substantially along line 4—4 of Fig. 3.

Cable 53 is thus provided with an enlargeable or contractible loop between the middle intermediate sheave 64 and the floating sheave 68. The cylinder 72 and the piston rod 70 supporting the floating sheave 68 extend upwardly and slightly forwardly in line with the intermediate sheave. Appropriate means (not shown) under control of the operator extend or retract the piston rod 70 whereby the size of the loop in cable 53 is enlarged or decreased as desired. When the size of the loop is enlarged as shown in Fig. 3 the length of the terminal bight of cable 53 extending between sheave 62, around sheave 63 and back to the terminal at 75 is at a minimum as illustrated in Fig. 3 in full lines, thereby holding the material handling device upright so that material may be supported thereon. When the piston rod 70 is extended to the extent shown in dash lines in Fig. 3, the size of the loop is accordingly decreased thereby causing a proportionate increase in the length of the bight of the cable between the carriage and the material handling device, permitting the material handling device to tip forwardly as indicated in dash lines in Fig. 3. The size of the loop in the cable may be changed at any time to any desired extent within the limits of the mechanism, regardless of the movement of the carriage and regardless of its position upon the tower. The operator is thereby able to dump material while the carriage is moving, and bring the material handling device back to upright position while the carriage is returning to ground level for a succeeding load.

Suitable means under control of the operator (not shown) are provided to extend or retract the tower elevating piston rod 28. As the tower leans back from its upright position, the upwardly extending reaches of the cables 52 and 53 respectively engage and partially pass around the outer pair of intermediate sheaves 64, and downwardly extending reaches of the cables 52 and 53 respectively engage and partially pass around the tower joint sheaves 67. Thus, the carriage and material handling device may be controlled, as previously described, when the upper tower section is in lowered position as illustrated in Fig. 2. Movement of the carriage and of the material handling device may be accomplished even while the upper tower section is being lowered or raised, merely taking care to see that the carriage is confined to the lower tower section.

Having illustrated and described a preferred embodiment of the present invention, it should be apparent to those skilled in the art that the same permits of modification in detail and arrangement. I claim as my invention all such modifications as come within the true spirit and scope of the appended claims.

I claim:

1. A lift vehicle comprising a wheeled chassis, an upright track tower mounted at one end of said chassis, carriage guiding track means extending along said tower, a carriage guided by said track means for ascending and descending movement along said tower, a material handling device mounted on said carriage, said device comprising an upright back portion and a forwardly projecting, load supporting portion secured thereto at a lower point thereof, transverse pivot means securing said material handling device at a lower point thereof to said carriage at a lower point thereof, a winch drum on said chassis near the base of said tower, a pair of tower sheaves coaxially mounted for independent rotation at the top of said tower, a lower carriage sheave on said carriage, an upper carriage sheave on said carriage, a material handling device sheave at the top of said upright back portion, three intermediate sheaves coaxially mounted for independent rotation at an intermediate point on said tower, a piston and cylinder device pivotally mounted on said chassis near the base of said tower and extending upwardly toward said intermediate sheaves, a floating sheave mounted at the upper end of said piston and cylinder device, a carriage control cable fastened to said winch drum at one end, then passing successively around said winch drum, then up and past one of said intermediate sheaves, then up and over one of said tower sheaves, then downward to said carriage and being fastened to said carriage at its other end, a material handling device cable also fastened to said winch drum at one end, then passing successively around said winch drum in the same direction as said carriage cable, then up and over another of said intermediate sheaves, then down and under said floating sheave, then upwardly past the third of said intermediate sheaves, then up and over the other of said tower sheaves, then down and under said lower carriage sheave, then up and over said upper carriage sheave, then forwardly and partly around said material handling device sheave, then back to and being attached to said carriage at its other end, means to rotate said winch drum to wind in or pay out both cables to the same extent simultaneously, and means to extend or contract said piston and cylinder device whereby the angular relation of said material handling device to said carriage may be varied while said carriage is moving up or down the tower or is stationary at any elevation thereon.

2. The construction set forth in claim 1 wherein said tower comprises a lower, fixed portion and an upper, pivoted portion movable from an elevated position in prolongation of said lower portion to the retracted position lying back over the chassis, and said intermediate sheaves are mounted adjacent the pivot point of said upper section so as to lie within the angle formed thereby when the tower upper portion is retracted, and a pair of tower joint sheaves mounted for independent rotation at the pivot point of the tower and engageable respectively with the downward reaches of said cables when the upper section is retracted, whereby said carriage may be operated while ascending or descending the lower portion of the tower and the angular relation of the material handling device with respect to the carriage may be altered in the same manner as when the upper tower section is elevated.

References Cited in the file of this patent

UNITED STATES PATENTS

| | | |
|---|---|---|
| 2,295,895 | Duden | Sept. 15, 1942 |
| 2,305,967 | Johnson | Dec. 22, 1942 |
| 2,342,934 | Grundon et al. | Feb. 29, 1944 |
| 2,639,829 | Dempster et al. | May 26, 1953 |
| 2,752,057 | Rush | June 26, 1956 |